US007064520B2

(12) United States Patent
Heigl et al.

(10) Patent No.: US 7,064,520 B2
(45) Date of Patent: Jun. 20, 2006

(54) ELECTRICAL CONNECTION ARRANGEMENT FOR HAND-HELD TOOLS WITH AUXILIARY DEVICES

(75) Inventors: Bernd Heigl, Augsburg (DE); Matthias Paetow, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 70 days.

(21) Appl. No.: 10/966,080

(22) Filed: Oct. 15, 2004

(65) Prior Publication Data

US 2005/0082920 A1 Apr. 21, 2005

(30) Foreign Application Priority Data

Oct. 16, 2003 (DE) ................................ 103 48 693

(51) Int. Cl.
*H02J 7/00* (2006.01)
*H01R 3/00* (2006.01)
*H01R 25/00* (2006.01)

(52) U.S. Cl. ........................ 320/114; 439/638; 439/500

(58) Field of Classification Search ................ 320/114, 320/111, 110, 107; 439/500, 638, 502
See application file for complete search history.

(56) References Cited

U.S. PATENT DOCUMENTS 4,924,246 A * 5/1990 Yamada ...................... 396/198
6,104,162 A * 8/2000 Sainsbury et al. .......... 320/111
6,582,250 B1 * 6/2003 Taylor et al. ............ 439/540.1
6,746,279 B1 * 6/2004 Lopez ........................ 439/620
6,771,079 B1 * 8/2004 Lin ............................ 324/550
6,936,936 B1 * 8/2005 Fischer et al. .............. 307/151
6,963,146 B1 * 11/2005 Zecca et al. ................. 307/9.1

FOREIGN PATENT DOCUMENTS

EP 1601092 * 11/2005
GB 2262399 * 6/1993
JP 06111897 * 7/2002

* cited by examiner

*Primary Examiner*—Pia Tibbits
(74) *Attorney, Agent, or Firm*—Abelman, Frayne & Schwab

(57) ABSTRACT

An electrical connection arrangement (10) for a battery pack-powered electrical hand-hand tool (2) has an adapter (16) which can be arranged at an electric hand-held tool (2) and which, for the electrical connection of the electric hand-held tool (2) to a battery pack (4), has an electric battery terminal (20) for the connection of the battery pack (4) and an electric hand-held tool terminal (18) for detachable connection of the electric hand-held tool and electrically connected with the battery terminal (20), and an auxiliary device terminal (12) for the electrical connection of the auxiliary device (8) with the battery pack, which auxiliary device terminal (12) can be detached from the auxiliary device (8) and is electrically connected to the battery terminal (20).

10 Claims, 3 Drawing Sheets

ELECTRICAL CONNECTION ARRANGEMENT FOR HAND-HELD TOOLS WITH AUXILIARY DEVICES

BACKGROUND OF THE INVENTION

1. Field of the Invention

The invention is directed to an electrical connection arrangement for hand-held tools with auxiliary devices and including an adapter which can be arranged at an electric hand-held tool.

2. Description of the Prior Art

For the electrical connection of the electric hand-held tool with a battery pack, the adapter has an electric battery terminal for the connection of the battery pack and an electric hand-held tool terminal whereby a separable connection of the electric hand-held tool with the battery pack becomes possible. An electrical connection between the battery terminal and the hand-held tool terminal is provided inside the adapter.

Electrical connection arrangements of the type mentioned above make it possible to operate respective auxiliary tools with the tool battery of the hand-held tool. Consequently, the auxiliary device does not need its own battery pack to drive it. In this way, production costs for the auxiliary device can be reduced on the one hand, and the total weight of the arrangement comprising a hand-held tool and an auxiliary device, e.g., a dust extractor, can be reduced, on the other hand.

A two-part dust extractor with a front suction module and a ventilator module is known from EP 1 240 976 by the applicant herein. The ventilator module can be inserted into the battery pack receptacle of a drilling device instead of a battery pack. The front suction module is subsequently secured to the drilling device so as to open toward the ventilator module on the flow output side. A cable connecting the ventilator module to a battery pack is connected to the ventilator module by a battery terminal. The battery pack is carried on the belt of the user. A motor is powered by the battery pack via the battery terminal at the ventilator module in order to drive the ventilator. In addition, the battery terminal is also connected to a hand-held tool terminal arranged at the ventilator module. This hand-held tool terminal makes electrical contact with a pair of contacts of the auxiliary device for powering the motor of the electric hand tool.

By constructing the ventilator in this way, the ventilator acts as a kind of an adapter the battery terminal of which enables both the dust extractor and the drilling device to be operated together by a single battery pack. Further, a particularly stable and comfortable attachment of the dust extractor to the drilling device can be achieved by attachment to the battery receptacle.

However, the hand-held tool and the dust extractor device in this arrangement must be adapted to one another with respect to their external shape as well as electrically. Consequently, the dust extractor device can only be used in connection with a specific type of hand-held tool. In addition, the power cable which connects the arrangement comprising the drilling device and dust extractor device to the battery pack worn on the belt can be a hindrance.

In an arrangement comprising a hand-held tool and an auxiliary device that is operated by a common battery pack, it is the object of the present invention to avoid the drawbacks mentioned above and to make it possible to use the auxiliary device with different types of hand-held tool while providing good handling and reducing costs.

SUMMARY OF THE INVENTION

This and other objects of the present invention, which will become apparent hereinafter, are achieved by providing an adapter having, for the electrical connection of an auxiliary device to the battery pack, a separate auxiliary device terminal for the electrical connection of the auxiliary device, which auxiliary device terminal is separable from the auxiliary device and is electrically connectable to the battery terminal inside the adapter.

In this way, it is possible to have an auxiliary device which is independent from the hand-held tool with which it is to be used. The necessary adaptations can be carried out almost entirely in the electrical connection arrangement, or its adapter, which can be produced in a simple and relatively economical manner. Accordingly, it is also possible, for example, to connect a dust extractor device to a wide variety of hand-held tool types by differently formed electrical connection arrangements.

A current switch or current shunt connected to all three terminals is advantageously provided. In a predetermined manner, this current shunt divides an input current flowing over the battery terminal during operation into an output current on the tool side for the hand-held tool and an output current on the auxiliary device side. With a current shunt of this kind, it can be ensured that the dust extractor device has sufficient current for an adequate suction power. By arranging the current shunt in the electrical connection arrangement, it is possible to provide a plurality of electrical connection arrangements with variously adjusted current shunts in order to optimize the power supply to the respective hand-held tool and dust extractor device by the battery pack that is used in each instance.

In a particularly preferred embodiment, the adapter has a fixing device on the tool side for mechanically fixing to the hand-held tool and a fixing device on the battery side for mechanically fixing the adapter to the battery pack, so that the battery terminal is electrically connected to the battery pack in the fixed state and the hand-held tool terminal is electrically connected to the hand-held tool in the fixed state. For this purpose, the battery terminal is electrically connected to the battery pack in the fixed state by a contact pair which is correspondingly provided at the battery pack, and the hand-held tool terminal is electrically connected to the hand-held tool in the fixed state by a contact pair which is correspondingly provided at the hand-held tool. In this way, it is possible to attach the battery pack to the hand-held tool with the intermediary of the adapter. A particularly compact arrangement comprising the hand-held tool, battery pack, dust extractor device, and electrical connection arrangement can be achieved in this way.

It is particularly advantageous when the fixing device on the tool side has a shape adapted for fixing to a battery receptacle of the hand-held tool. In this way, it is possible to achieve a particularly stable fixing of the adapter and battery pack to the hand-held tool.

The hand-held tool terminal is preferably arranged at the tool-side fixing device in an area which, in the fixed state in relation to the hand-held tool, contacts a contact pair of the hand-held tool provided for a normal battery operation. Accordingly, the same contact pair of the hand-held tool can be used for the operating mode with auxiliary device and with the adapter intermediately connected to the battery receptacle as well as for the normal operating mode without the auxiliary device and with the tool battery attached directly to the battery receptacle. Therefore, no device adapting is required on the part of the hand-held tool.

Further, it is particularly advantageous when the fixing device on the battery side has a shape negative with respect to the shape of the fixing device on the tool side. In this way, it is possible to use the battery pack, which is normally used for the power supply of the hand-held tool, together with the electrical connection arrangement so that the battery is now fixed to the hand-held tool with the intermediary of the adapter.

An auxiliary device plug is advantageously electrically connected to the auxiliary device terminal, this auxiliary device plug having, in an area which can be mechanically connected to the auxiliary device, an outer geometry corresponding to the outer geometry of a battery pack contained in a product range of the auxiliary device. Accordingly, it is possible to use the electrical connection arrangement to supply an auxiliary device as an alternative to a battery pack that is provided by the manufacturer for autonomous operation of the auxiliary device. Neither a determined receptacle for the auxiliary device terminal nor a special adapter is required at the auxiliary device for this purpose.

Further, it is advantageous when the auxiliary device plug has a detachable connection to the auxiliary device terminal in order to be able to use different adapters, as needed, which are provided for a determined type of hand-held tool.

A voltage transformer is preferably provided for a predetermined setting of a supply voltage for the auxiliary device and is advantageously arranged in the auxiliary device plug. This ensures that a suitable voltage is applied to the auxiliary device in operation. By exchanging the electrical connection arrangement or auxiliary device terminal, a suitable supply voltage can be selected for different auxiliary devices.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
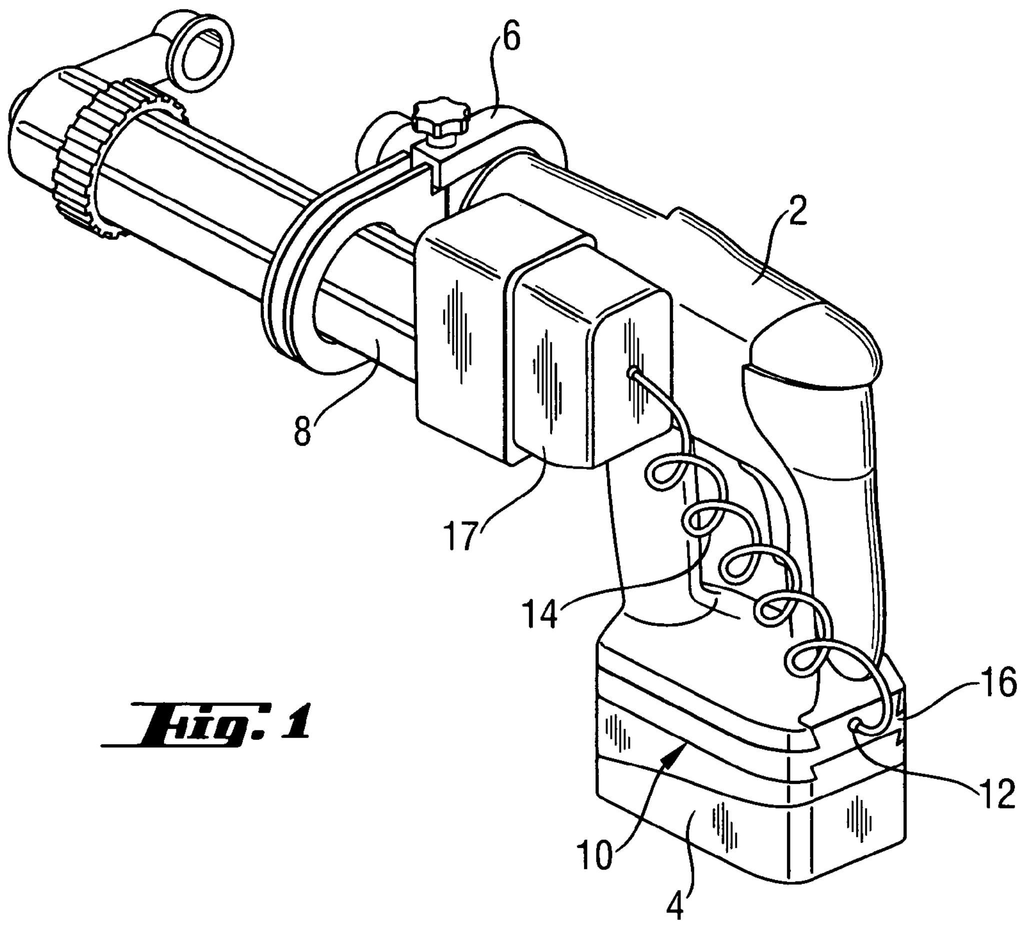
FIG. 1 shows a perspective view of an arrangement comprising a battery-powered electric hand-held tool, a dust extractor device, a battery pack, and an electrical connection arrangement according to the present invention.

FIG. 1 shows a hand-held tool 2 such as a drilling device, a chisel device or a combination drill-chisel device. The hand-held tool 2 is supplied with the necessary power by a battery pack 4. An auxiliary device 8 in the form of a dust extractor is removably fastened to the hand-held tool 2 by a clamp 6.

In order to supply the hand-held tool 2 and the auxiliary device 8 with power from the same battery pack 4 simultaneously, an electrical connection arrangement 10 is provided which can be electrically connected to the hand-held tool 2, battery pack 4, and the auxiliary device 8 at the same time. For this purpose, the electrical connection arrangement 10 has an auxiliary device terminal 12 at an adapter 16 which is constructed as an adapter shoe. This auxiliary device terminal 12 is connected to an auxiliary device plug 17 by an electric conductor 14 in the form of a power cable.

Figure 2:
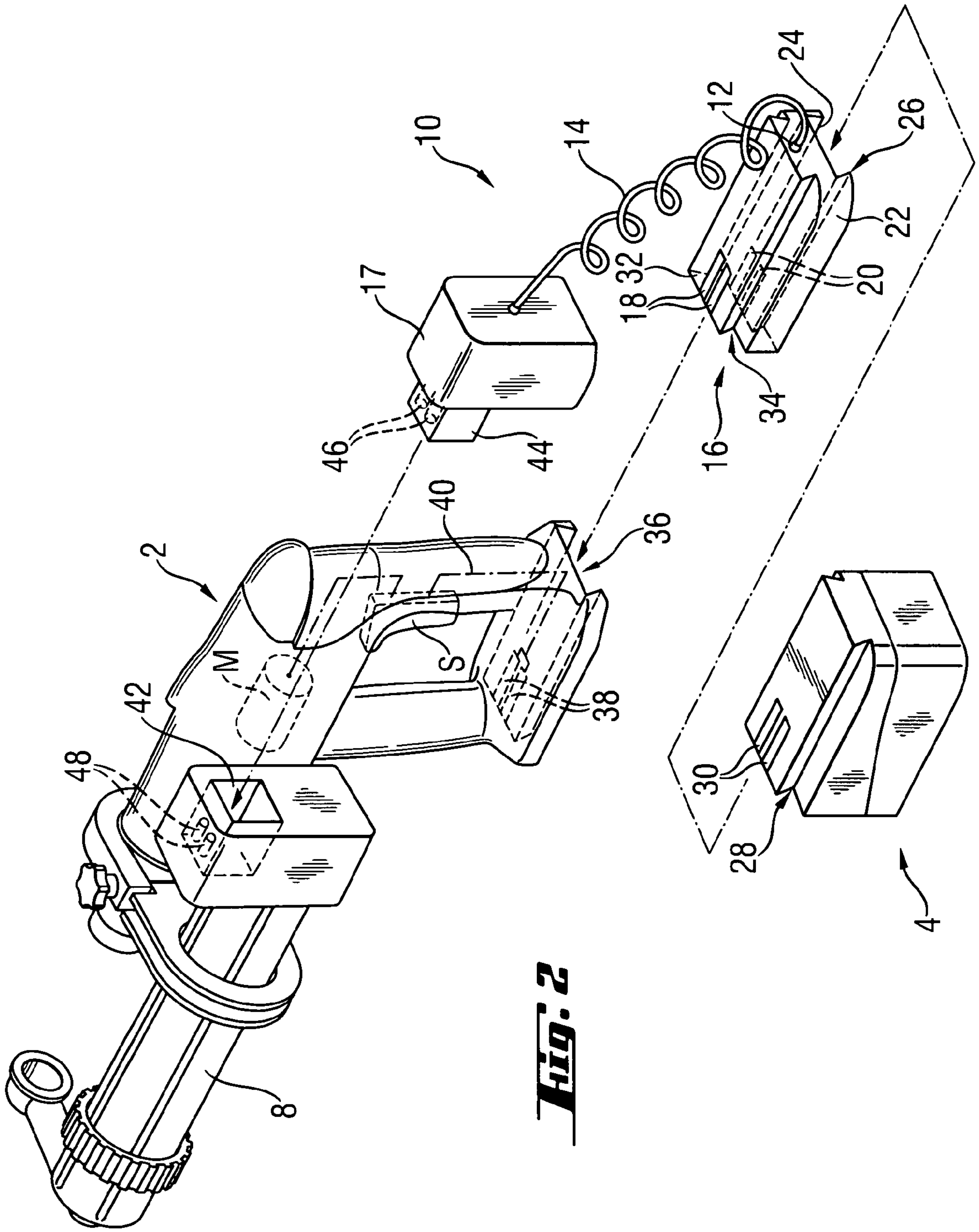
FIG. 2 shows a perspective exploded view of the arrangement according to FIG. 1.

As can be seen from FIG. 2, the adapter 16 has housing 22, a battery terminal 20, shown in dash lines and arranged at the bottom 24 of the adapter housing 22. Further, the adapter housing 22 has an electric hand-held tool terminal 18 at an upper side 32. Both terminals 18, 20 have a contact pair, e.g., in the form of contact reeds or contact plugs.

As can also be seen from FIG. 2, the battery terminal 20 is arranged at a fixing device 26 on the battery side which is formed at the bottom 24 of the adapter housing 22. A fixing area 28 of the battery pack 4 has a dovetail profile that, upon insertion of the battery pack 4, cooperates with a complementary profile of the fixing device 26 so that the battery pack 4 becomes fixed relative to the adapter 16. In the fixed state, the adapter contact pair of the battery terminal 20 is in electrical contact with a battery contact pair 30 of the battery pack 4.

Further, the adapter housing 22 has, at the upper side 32, a tool-side fixing device 34 has a dovetail profile which is negative with respect to the profile of the battery-side fixing device 26. This tool-side fixing device 34 can be inserted into and fixed in a battery receptacle 36 of the hand-held tool 2 having a complementary dovetail profile. In the fixed state, the hand-held tool contact pair of the terminal 18 is in electrical contact with a tool contact pair 38. As shown schematically, this tool contact pair 38 is connected to a motor M which drives the hand-held tool 2 upon actuation a switch S by via a supply line 40 (dash-dot line).

The auxiliary device 8 has a plug receptacle 42 for receiving the auxiliary device plug 17 of the electrical connection arrangement 10. A plug-in area 44 of the auxiliary device plug 17 can be inserted into this plug receptacle 42. In the inserted state, a plug-in contact pair 46 which is arranged at the plug-in area makes electrical contact with a complementary plug contact pair 48 arranged in the plug receptacle 42.

The plug-in area 44 has an outer geometry which corresponds to a plug-in area of a suction module battery pack, not shown, from a product range of the auxiliary device 8 by which the auxiliary device 8 can be operated independently from the hand-held tool 2. Accordingly, it is possible to supply the auxiliary device 8 with power either with its own suction module battery pack provided by the manufacturer or by using the electrical connection arrangement 10 with the battery pack 4 of the hand-held tool 2.

To operate the auxiliary device 8 with the battery pack 4 of the hand-held tool 2, the battery pack 4, which serves to supply power in normal operation of the hand-held tool 2 without the auxiliary device 8, is removed from the battery receptacle 36. The adapter 16 of the electrical connection arrangement 10 is then fixed to the battery receptacle 36 in the manner described above, and the battery pack 4 is fixed to the adapter 16 as is shown in FIG. 1. Further, the auxiliary device plug 17 of the electrical connection arrangement 10 is connected to the plug receptacle 42 of the auxiliary device 8 which is secured on the hand-held tool 2 with the clamp 6.

A particularly compact arrangement, comprising hand-held tool 2, auxiliary device 8, battery pack 4 and, electrical connection arrangement 10, which is maintained as a unit in operation is achieved in this way. The power supply is carried out for the hand-held tool 2 and for the auxiliary device 8 using the battery pack 4 which is normally used for supplying power to the hand-held tool 2.

Figure 3:
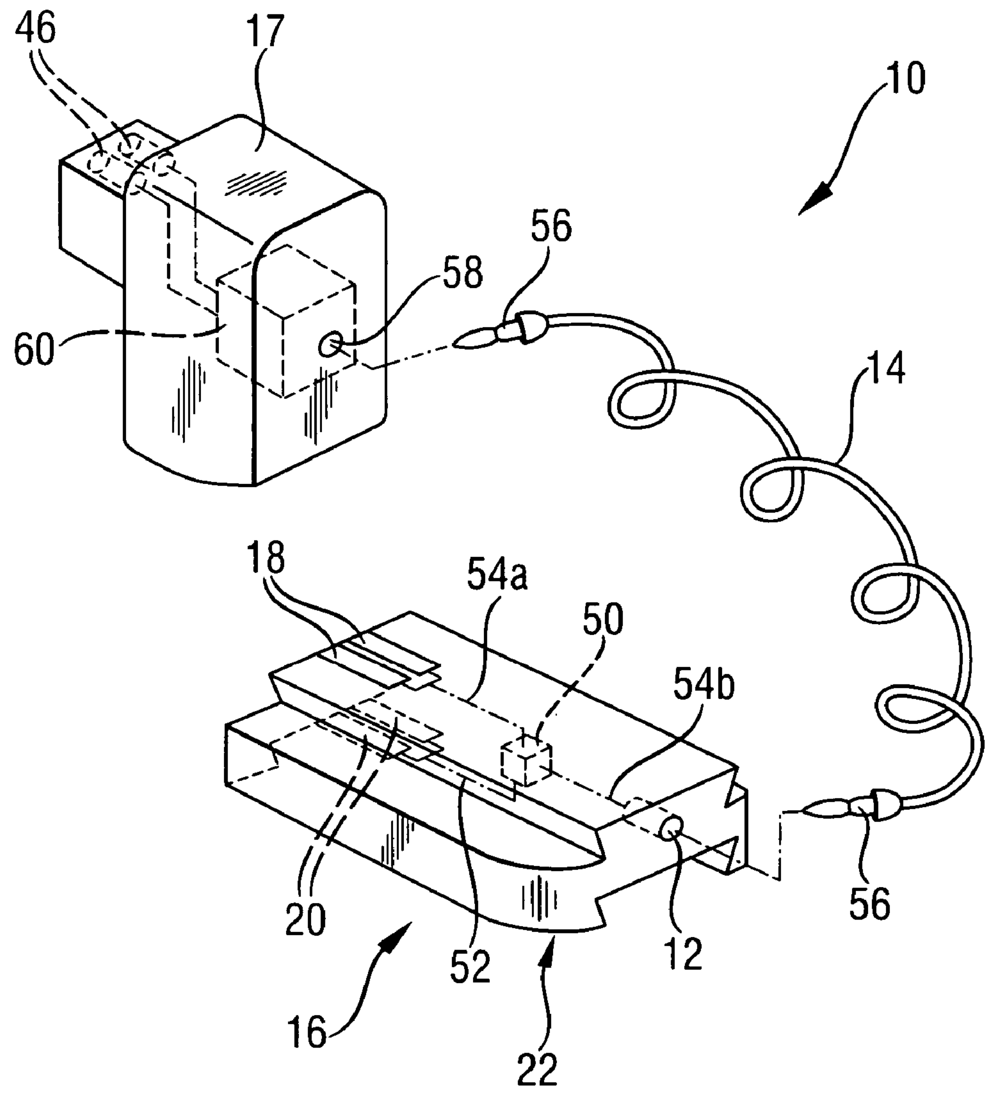
FIG. 3 shows a perspective view of an alternative electrical connection arrangement in a detached state.

As can be seen from FIG. 3, the supply current for the hand-held tool 2 and auxiliary device 8 is divided by a current shunt 50, shown schematically, which is accommodated in the adapter 16. For reasons of clarity, only the visible edges of the adapter housing 22 are shown in FIG. 3. The current shunt 50 is connected to the battery terminal 20 by an access line 52 and to the hand-held tool terminal 18 by a first line branch 54*a*. Further, the current shunt 50 is connected to the auxiliary device terminal 12 by a second line branch 54*b*.

FIG. 3 shows an embodiment form of the electrical connection arrangement 10 in which the electric line 14 is not fixedly connected to the adapter 16 and the auxiliary device plug 17. Instead, the electric line 14 has a plug-shaped electrical connection element 56 at its respective ends. One of these connection elements 56 can be inserted into a complementary electrical connection element 58 in the form of a socket at the auxiliary device plug 17. The other connection element 56 can be inserted at the auxiliary device terminal 12 which is likewise constructed in the form of a socket for this purpose.

As shown schematically by dash-dot lines, the complementary connection element 58 at the auxiliary device plug 17 is electrically connected to the plug contact pair 46 of the auxiliary device plug 17 by a voltage transformer 60. This ensures that a predetermined suitable voltage is applied to the auxiliary device 8 in operation. As an alternative to the arrangement of the voltage transformer in the auxiliary device plug 17, it is also possible to accommodate it in the adapter 16.

In the detachable embodiment form of the electrical connection arrangement 10 shown in FIG. 3, it is possible to exchange every individual part, for example, in order to exchange the adapter 16 and accordingly to use the auxiliary device 8 with a large number of different hand-held tools 2 by using the electrical connection arrangement 10. On the other hand, it is also possible in this way to provide different auxiliary device plugs 17 with the voltage transformer suited for a respective auxiliary device 8.

With a corresponding construction of the drilling device 2 and the auxiliary device 8, it is also possible for the electrical connection arrangement 10 to be formed by the adapter 16 alone, as an alternative to the embodiments shown herein.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An electrical connection (10) arrangement for a battery pack-powered electrical hand-held tool, comprising an adapter (16) connectable with the electrical hand-held tool (2) and a battery pack (4) for electrically connecting the electrical hand-held tool (2) with the battery pack (4), the adapter (16) including an electrical battery terminal (20) for releasably electrically connecting the adapter (16) with the battery pack (4), an electrical tool terminal (18) for releasably electrically connecting the adapter (16) with the electrical hand-held tool and which is electrically connected with the battery terminal (20), and an auxiliary terminal (12) for releasably electrically connecting the adapter (16) with an auxiliary tool (8) and which is electrically connected with the battery terminal (20).

2. Electrical connection arrangement according to claim 1, wherein the adapter (16) further includes a current shunt (50) connected to all three terminals (12, 18, 20) for dividing an input current flowing over the battery terminal during operation into an output current on a tool side and an output current on an auxiliary device side.

3. Electrical connection arrangement according to claim 1, wherein the adapter (16) includes fixing means (34) on a tool side thereof for mechanically connecting the adapter (16) with the hand-held tool (2) and fixing means (26) on a battery side for mechanically connecting the adapter (16) with the battery pack (4), and wherein the battery terminal (20) becomes electrically connected to the battery pack (4) and the hand-held tool terminal (18) becomes electrically connected to the hand-held tool (2) when the adapter (16) is mechanically connected with the battery pack (4) and the hand-held tool (2).

4. Electrical connection arrangement according to claim 3, wherein the fixing means (34) on the tool side has a shape adapted for being fixed to a battery receptacle (36) of the hand-held tool (2).

5. Electrical connection arrangement according to claim 4, wherein the hand-held tool terminal (18) is arranged at the tool-side fixing means (34) in an area which contacts a contact pair of the hand-held tool (2) provided for normal battery operation when the adapter (16) is mechanically connected with the hand-held tool (2).

6. Electrical connection arrangement according to claim 3, wherein the battery pack side fixing means (26) has a shape negative with respect to that of the fixing means (34) on the tool side.

7. Electrical connection arrangement according to claim 1, further comprising an auxiliary device plug (17) electrically connected to the auxiliary device terminal (12), the auxiliary device plug (17) having, in an area that can be mechanically connected to the auxiliary device (8), an outer geometry corresponding to the outer geometry of a battery pack contained in a product range of the auxiliary device (8).

8. Electrical connection arrangement according to claim 7, wherein the auxiliary device plug (17) has a detachable connection to the auxiliary device terminal (12).

9. Electrical connection arrangement according to claim 1, further comprising a voltage transformer (60) provided for a predetermined setting of a supply voltage for the auxiliary device (8).

10. Electrical connection arrangement according to claim 9, wherein the voltage transformer (60) is arranged in the auxiliary device plug.

* * * * *